(12) United States Patent
Prophete et al.

(10) Patent No.: US 8,271,837 B2
(45) Date of Patent: Sep. 18, 2012

(54) PERFORMING ASYNCHRONOUS TESTING OF AN APPLICATION OCCASIONALLY CONNECTED TO AN ONLINE SERVICES SYSTEM

(75) Inventors: Didier Prophete, San Francisco, CA (US); Ronald Fischer, San Francisco, CA (US); Sönke Rohde, San Francisco, CA (US); Amol Hardikar, San Francisco, CA (US); Madhav Pathak, Union City, CA (US); Mark Movida, Berkeley, CA (US); Artur Kesel, Daly City, CA (US)

(73) Assignee: Salesforce.com, Inc., San Francisco, CA (US)

( * ) Notice: Subject to any disclaimer, the term of this patent is extended or adjusted under 35 U.S.C. 154(b) by 49 days.

(21) Appl. No.: 12/874,963

(22) Filed: Sep. 2, 2010

(65) Prior Publication Data

US 2011/0302454 A1    Dec. 8, 2011

Related U.S. Application Data

(63) Continuation-in-part of application No. 12/838,388, filed on Jul. 16, 2010.

(60) Provisional application No. 61/352,312, filed on Jun. 7, 2010, provisional application No. 61/357,070, filed on Jun. 21, 2010, provisional application No. 61/352,274, filed on Jun. 7, 2010.

(51) Int. Cl.
*G06F 11/00* (2006.01)

(52) U.S. Cl. .................. 714/38.1; 714/4.1; 714/47.1

(58) Field of Classification Search .................. 714/4.1, 714/38.1, 47.1
See application file for complete search history.

(56) References Cited

U.S. PATENT DOCUMENTS

| 7,496,903 | B2 * | 2/2009 | Rees et al. .................. 717/130 |
| 7,788,536 | B1 * | 8/2010 | Qureshi et al. ............ 714/38.14 |
| 2003/0120593 | A1 * | 6/2003 | Bansal et al. .................. 705/39 |
| 2005/0039171 | A1 * | 2/2005 | Avakian et al. ............... 717/127 |
| 2007/0100834 | A1 | 5/2007 | Landry et al. |
| 2009/0077114 | A1 | 3/2009 | Zachariah |

OTHER PUBLICATIONS

Non-Final Office Action for U.S. Appl. No. 12/838,388, mailed May 4, 2012.

* cited by examiner

*Primary Examiner* — Charles Ehne
(74) *Attorney, Agent, or Firm* — Ingrassia Fisher & Lorenz, P.C.

(57) ABSTRACT

In a method, system, and computer-readable medium having instructions for performing asynchronous testing of an application that is occasionally connected to an online services system, metadata describing at least a portion of an online services database is retrieved and the at least a portion of the online services database is authorized for replication at a software application, information is determined for an entity for an application database from the metadata, a request is sent for a database using the software application interface and the request has an asynchronous operation call to the database for the entity, an execution of the asynchronous operation call is recorded within a callback function, a response is received for the asynchronous operation call, and a result is determined for the software application performance.

8 Claims, 6 Drawing Sheets

PERFORMING ASYNCHRONOUS TESTING OF AN APPLICATION OCCASIONALLY CONNECTED TO AN ONLINE SERVICES SYSTEM

CROSS REFERENCE TO RELATED PATENTS

This application is a continuation-in-part and claims the benefit to the following co-pending application, U.S. patent application Ser. No. 12/838,388, entitled "MAINTAINING APPLICATIONS THAT ARE OCCASIONALLY CONNECTED TO AN ONLINE SERVICES SYSTEM," filed on Jul. 16, 2010, which is hereby incorporated by reference, as if it is set forth in full in this specification, and which claims the benefit of the following provisional applications: U.S. Provisional Patent Application 61/352,312 entitled "Methods and Systems for maintaining data consistency between a client and server in a multi-tenant database system," filed on Jun. 7, 2010, Prophete et al., the entire contents of which are incorporated herein by reference, U.S. Provisional Patent Application 61/357,070, entitled "Methods and Systems for using smart widgets in a multi-tenant database environment," filed on Jun. 21, 2010, Prophete et al., the entire contents of which are incorporated herein by reference, and U.S. Provisional Patent Application 61/352,274, entitled "Methods and systems for resolving conflicting client/server data in a multi-tenant database environment," filed on Jun. 7, 2010, Prophete et al., the entire contents of which are incorporated herein by reference. This application also claims the benefit of U.S. Provisional Patent Application 61/352,312 entitled "Methods and Systems for maintaining data consistency between a client and server in a multi-tenant database system," filed Jun. 7, 2010, Prophete et al., the entire contents of which are incorporated herein by reference, U.S. Provisional Patent Application 61/357,070, entitled "Methods and Systems for using smart widgets in a multi-tenant database environment," filed on Jun. 21, 2010, Prophete et al., the entire contents of which are incorporated herein by reference, and U.S. Provisional Patent Application 61/352,274, entitled "Methods and systems for resolving conflicting client/server data in a multi-tenant database environment," filed on Jun. 7, 2010, Prophete et al., the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to testing applications that are occasionally connected to an online service system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

Unfortunately when some third-party software is used with a conventional database system, data management software for the third-party software may be installed at a database server for the conventional database. Installation of third-party software at a database server for a multi-tenant database may not be feasible because installation of the software at the server that handles data for multiple customers presents many security risks. Testing platforms offered by third-party software vendors that typically install third-party data management software at the database server are insufficient to test applications developed to access an online services system using alternative approaches.

BRIEF SUMMARY

In accordance with embodiments, there are provided methods, computer readable mediums, systems, and apparatuses for performing asynchronous testing of applications occasionally connected to an online services system.

In an embodiment and by way of example, metadata describing at least a portion of an online services database is retrieved and the at least a portion of the online services database is authorized for replication at a software application, information is determined for an entity for an application database from the metadata, a request is sent for a database using the software application interface and the request has an asynchronous operation call to the database for the entity, an execution of the asynchronous operation call is recorded within a callback function, a response is received for the asynchronous operation call, and a result is determined for the software application performance.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

General Overview

Figure 1A:
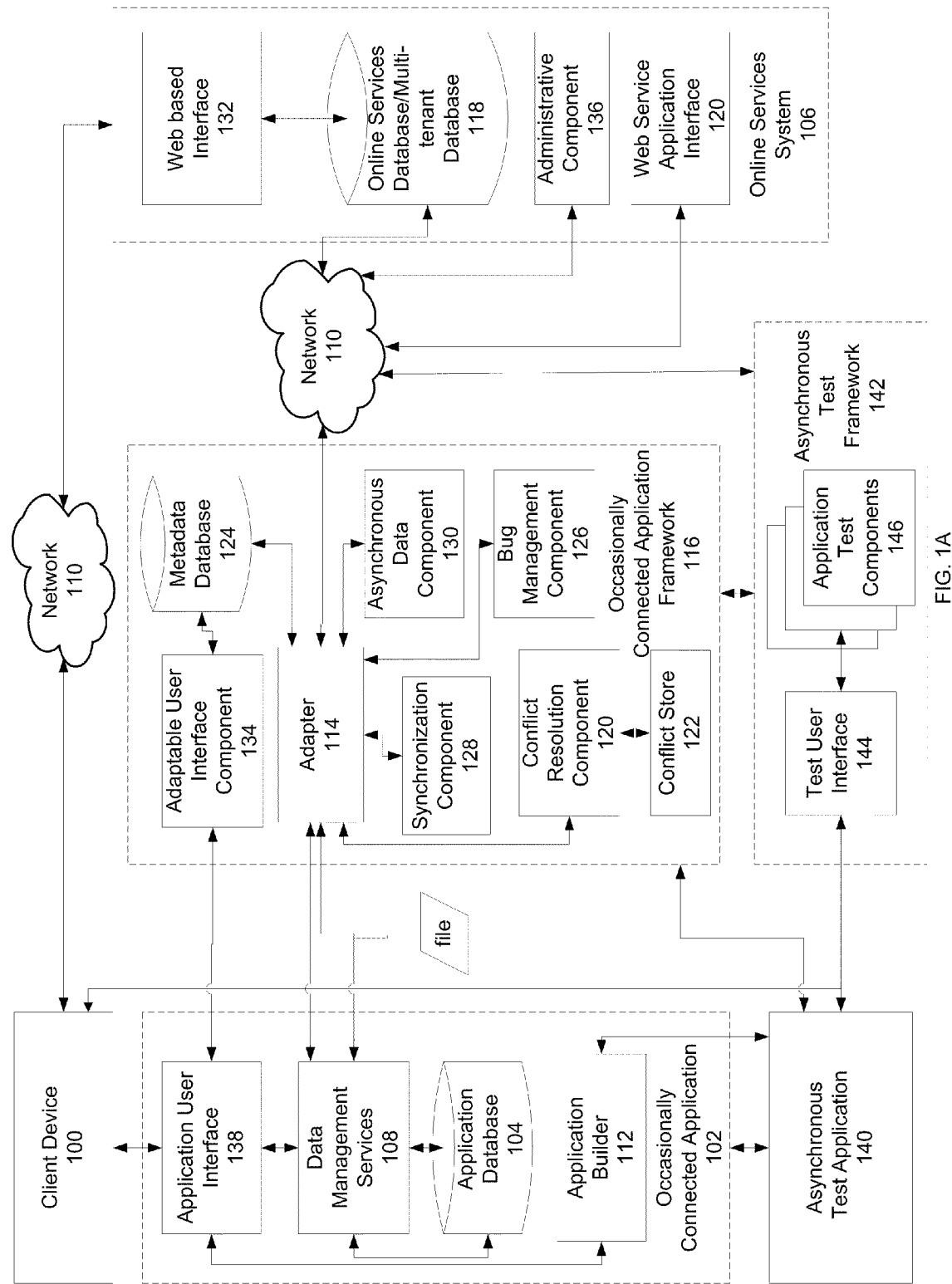
FIG. 1A illustrates a block diagram of an example of an implementation of performing asynchronous testing of an application occasionally connected to an online services system.

Systems, methods, computer readable mediums, and computer program products are provided for testing a software application that is occasionally connected to an online services system. Embodiments of the present invention provide a framework or infrastructure that allows for the development of a software application to test another software application. In one or more embodiments, the software application under test is capable of running while connected over a network with an online services system as well as run seamlessly disconnected from the online services system. Embodiments of the present invention provide a framework that allows for the development of a software application to test the functionality of another software application that makes asynchronous operation calls and/or requests to a database and/or a database server of an online services system.

As used herein, the term "asynchronous test application" may be used to refer to a software application implemented by the framework of the present invention to test another software application and may be used interchangeably throughout. As used herein, the terms "software application" or "occasionally connected application" may be used to refer to the software application under test and used interchangeably throughout. Although the term "database server" may be used throughout as an example implementation of sending calls and/or requests to a server, those skilled in the art will recognize that there are other implementations of sending requests and/or operation calls to a server and receiving responses for the requests and/or calls from a server.

Asynchronous operation calls are operation calls and/or requests to a database server for operations that may be executed against the database in the background while the database and/or database server continues to handle and/or allow operations to be executed against the database. Asynchronous calls/requests may not immediately return to the caller requesting the operation. There are many reasons that a database and/or database server may delay execution and return a response to the caller of an operation including, but not limited to, the following: a database/database server is busy, a database/database server may have a queue of work waiting, a database/database server is sleeping, a connection to the database server/database is lost, and/or any other reason that a reply/response may not be received from the database and/or database server.

Asynchronous operation calls to a database server may include, but are not limited to, create, read, update, delete, and/or any other operations for the database. Asynchronous operation calls present issues with testing both in simulating the delays experienced with receiving responses for asynchronous calls and tracking the order of requests sent/received responses from an asynchronous call to a database/database server in light of the execution latency that may be experienced. Without knowledge of the execution latency experienced by the software application under test with the asynchronous calls, it may be difficult to pinpoint errors with the application. For example, if the software application under test is used to access data at a database and it fails, then it may be useful to know if the access failed because the software application did not handle synchronization of data properly with the database or whether an asynchronous call operation had not yet finished before the attempted access of data affected by the asynchronous call operation. Synchronous calls to the database are commands and/or operations that may require the database server to finish and/or stop executing other operations for a software application in order to perform the synchronous operation for the software application.

Embodiments of the present invention may test the functionality of the software application under test using methods, including, but not limited to: making multiple operation database server calls, executing compound tests, testing the user interface of the software application, delaying operation execution by the database server, delaying operation calls by a simulation of the database server, tracking the order of responses to calls from database server and/or simulation of a database server to record the execution latency of an asynchronous operation call, tracking references to objects created by tests for garbage collection, tracking references to objects created by tests to check garbage collection of the software application under test, simulating synchronous operation calls, and/or testing a local database of the software application. In one or more embodiments, the asynchronous test application implemented with the framework of the present invention may set up (e.g. instantiate) and clean up (e.g. perform garbage collection) of test objects created for data either provided by the database server from the database or created to emulate/simulate a database server providing data and/or responses to operation calls. Test objects may be created for data both at the client-side and the server-side, and the asynchronous test application may be set up, ensure clean up by the software application under test, and clean up any test objects created by the software application under test not handled by the garbage collection of the software application.

In one or more embodiments, the software application under test may make asynchronous operation calls while performing functions that include, but are not limited to, replicating the data located at an online service, synchronizing with the data located at an online service, sending translated commands between a local database and an online services database, and rendering and/or providing user interface functionality with user interface components. The software application under test may replicate and synchronize data from a remote database system of an online services system. In a preferred embodiment, the remote database system is a multi-tenant database system. The software application under test may also be implemented using an application framework and the software application may access or manipulate an online services data whether the application is connected or disconnected from the online service. Embodiments of the software application under test may provide conflict resolution, user interface components, translation of operations performed on data both at the offline application and the online services system, and bug management capabilities.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, methods, systems, apparatuses, and computer readable mediums for maintaining applications that are occasionally connected to an online services system will be described with reference to example embodiments.

FIG. 1 illustrates a block diagram of an example of an implementation for performing asynchronous testing of an application occasionally connected to an online services system. In one or more embodiments, the software application under test may be an Occasionally Connected Application 102 implemented using an Occasionally Connected Framework 116. Client Device 100 may have an Occasionally Connected Application 102 stored and able to be executed on the Client Device 100. As will be appreciated by those skilled in the art, the functional elements of Occasionally Connected Application 102 as illustrated in FIG. 1, are provided as an example, and various implementations of the system may have subsets of the functional elements and/or subsets may be distributed among various computer systems. Client Device 100 may include, but is not limited to, a mobile device, a smart phone, an Apple iPhone™, a cellular phone, a BlackBerry® device, a personal digital assistant (PDA), a mp3 player, a laptop, a computer, or any other type of computer system. In a preferred embodiment, the Occasionally Connected Application 102 is a stand-alone application installed on the Client Device 100 with a local Application Database 104. In another embodiment, the Client Device 100 may have a browser-based application and the Application Database 104 may be remote to the Client Device 104.

The Application Database 104 stores data that may be used, accessed, or manipulated while the Occasionally Connected Application 102 is offline or disconnected from a Network 110 and/or unable to directly use the Online Services System 106. A database is any collection of data that may be stored and queried for retrieval of the stored data. Implementations of a database include, but are not limited to, multi-tenant databases, relational databases, object-oriented databases, and file systems. The database may have a database server or a database management system for receiving requests (e.g. query requests) and/or operation calls and sending responses to requests and/or operation calls for the database. In a preferred embodiment, the Application Database 104 is a SQLite relational database. The Occasionally Connected Application 102 may have a Data Management Services 108 to handle operations (e.g., create, read, update, and delete) for the Application Database 104 used by the Occasionally Connected Application 102.

Optionally, the Occasionally Connected Application 102 may utilize an Application Builder 112 to create the Occasionally Connected Application 102 and associated Application User Interface 138. In a preferred embodiment, an Application Builder 112 may be an integrated development environment, such as Adobe Flash Builder, or a cross platform runtime environment, such as Adobe Air. The Application Builder 112 may allow for a pluggable adapter to communicate with Data Management Services 108. The Application Builder 112 may provide functions and methods for making asynchronous calls to a database, such as the Online Services Database 118.

The Data Management Services 108 may communicate with the Adapter 114 of the Occasionally Connected Application Framework 116 to synchronize and replicate data in the Application Database 104 and the Online Services Database/Multi-tenant Database 118 of the Online Services System 106. The Data Management Services 108 may act as a synchronization engine for the Occasionally Connected Application 102. The Data Management Services 108 may store operations to be executed or that have been executed on data that is both stored locally (e.g., Application Database 104) and at other remote locations (e.g., Multi-tenant Database 118). Although an implementation is described with reference to the use of a multi-tenant database as an online services database, those skilled in the art will recognize that the online services database may be implemented with alternative types of databases.

The Adapter 114 may provide a translation service to translate operations executed against the Application Database 104 into operations understood by the Multi-tenant Database 118 in order to synchronize data between the databases. In a preferred embodiment, a Web Service Application Interface 120, such as a SOAP API, is used by the Adapter 114 to communicate the translated operations executed on the data at the Application Database 104 to the Online Services System 106. The Adapter 114 makes Simple Object Access Protocol (SOAP) calls over Hypertext Transport Protocol (HTTP) to the Online Services System 106 to communicate the translated operations.

When the Adapter 114 communicates the translated commands to be executed on the Multi-tenant Database 118, conflicts may arise. For example, conflicts may arise because the underlying data that the command concerns has been altered on the Multi-tenant Database 118 while the Occasionally Connected Application 102 was offline or since the last synchronization. Errors may also occur when the translated commands are executed against the Multi-tenant Database 118 and the Multi-tenant Database 118 enforces validation rules that are not enforced at the Application Database 104.

In one or more embodiments, the Adapter 114 may identify that there are conflicts with operations prior to attempting to execute the operations at the Multi-tenant Database 118 using the received metadata. For example, a conflict may be apparent when the received metadata indicates that an entity or record has been removed or is no longer available for manipulation by the user, and a stored operation involves the entity.

The Occasionally Connected Application Framework 116 provides a Conflict Resolution Component 120 for handling conflict resolution between the Multi-tenant Database 118 and the Application Database 104. Conflicts/Errors are stored in a Conflict Store 122 and the user has the option to review and resolve conflicts with a conflict user interface provided by the Occasionally Connected Framework 116.

The Adapter 114 may be used to replicate at least a portion of the schema and data at the Multi-tenant Database 118 for the Occasionally Connected Application 102. The Adapter 114 adapts data from Multi-tenant Database 118 to go into the Application Database 104 for the Occasionally Connected Application 102. The Data Management Services 108 may generate a database schema based on the information provided by the Adapter 114. In one or more embodiments, the Adapter 114 retrieves metadata from the Multi-tenant Database 118 that provides a description of the database so that the relevant portion of the database can be replicated at the Occasionally Connected Application 102. The metadata retrieved by the Adapter 114 may be stored in the Metadata Database 124. The information indicated by the metadata may be communicated by the Adapter 114 to the Data Management Services 108 to generate a schema or alter a portion of a schema for the Application Database 104.

In one or more embodiments, the Adapter 114 may communicate the information about entities in the metadata with an Extensible Markup Language (XML) file to the Data Management Services 108. The Data Management Services 108 may take the XML file that describes the records and entities to be used by the Occasionally Connected Application 102 and generate a schema for the Application Database 104. In a preferred embodiment, introspection is performed on a Web Service Description Language (WSDL) file for the Online Services System 106 to produce the XML file sent to Data Management Services 108 to initially create the Application Database 104. WSDL is an XML-based language that provides a model for describing Web services. The XML file may be used by a script to generate classes to instantiate remote objects (including remote methods) to access each entity in the Multi-tenant Database 118 and to create tables in the Application Database 104. In a preferred embodiment, the generated classes have properties or fields that are bindable. A class that has bindable properties may provide notification when the property has changed.

Scripts may also use the XML file to generate classes to access the data in the Application Database 104 and the classes may be instantiated to allow for accessing data in the Application Database 104 when the Occasionally Connected Application 102 is offline. Each class generated by the script may represent an entity, table, or record in the Multi-tenant Database 118. In a preferred embodiment, Adobe Fiber is used to generate remote objects, create the local database, and objects used locally to access and manipulate data at the local database.

The metadata may have data that describes entities or records stored within the Online Services System 106. The metadata may describe entities or records that are internally used by the Online Services System 106 as well as entities or records that are displayed to the user with the Adaptable User Interface Components 134 to allow for manipulation of the data with the Occasionally Connected Application 102. For example, the Online Services System 106 may have a set of records for bug management that are used internally for logging errors that happen during execution of the Occasionally Online Application 102. The user may log bugs and/or the Occasionally Connected Application 102 may log errors that occur during execution in a record/entity at the Application Database 104 and the data in the record/entity for bug management may be synchronized with the data for the entity at the Multi-tenant Database 118. In another example, the Online Services System 106 may have records for accounts for users at the Online Services System 106 that are used internally to store login/password for the user and/or a user role. The Occasionally Connected Application Framework 116 provides a Bug Management Component 126 for handling bugs reported and generating the user interface for handling bugs at the Occasionally Connected Application 102.

The metadata may provide information on the user interface of the Online Services System 106. For example, the metadata may include, but is not limited to, information on users, information on user roles, and the data and layout that the user can have on their web based interface. An Administrative Component 136 is provided by the Online Services System 106 to enable the user to define the entities or records and data that a user or set of users are able to access. Upon authentication of the user or set of users, the metadata and data that the user is authorized to receive may be provided to the Adapter 114 for the Occasionally Connected Application 102. The layout that the user expects from the Web Based Interface 132 may be captured and displayed at the Occasionally Connected Application 102 using the Adaptable User Interface Components 134. The Adaptable User Interface Components 134 rely on the description of the entities provided by the metadata to ensure that all aspects of the current design of the entity can be rendered in the user interface of the Occasionally Connected Application 102.

The Adapter 114 may continually retrieve metadata for the Occasionally Connected Application 102 in order to capture any changes to the entities or permissions regarding access to the entities that may then be reflected in the schema for the Application Database 104. For example, the metadata may indicate that a field for an entity "Account" has changed type from integer to long or that a field as been eliminated from the entity. In one or more embodiments, the new metadata may cause a script to be run to generate a new class or set of classes for the entity (e.g., remote objects to access the online service system and local objects for the local database) Occasionally Connected Application 102. In another embodiment, the new metadata may cause additional fields and/or methods to be available for an entity. The Adaptable User Interface Component 134 may rely on a generated class or class that has been modified in accordance with the metadata to provide a current view of the entity for rendering the user interface.

A multi-tenant database may have a dynamic schema and offer the user or administrator the ability to easily change any aspect of the schema (e.g. entities) for the multi-tenant database. In one or more embodiments, the Adapter 114 must capture the metadata that indicates changes at the multi-tenant database and determine how and whether to reflect the changes at the relational database at the Occasionally Connected Application 102. Examples of changes that may occur at the Multi-tenant Database 118 that are reflected in metadata, include, but are not limited to, an administrator indicates an entity may be replicated for the user, an entity is removed from use by a user, a new attribute is added to an entity, an attribute is removed from an entity, a type for an attribute of an entity may be changed, and/or metadata about an existing attribute. As used herein, the terms "attribute," "property," and "field" may be used interchangeably to indicate a field of a record or an entity. In one or more embodiments, the implementation of the multi-tenant database may be dynamically-typed. For example, the fields of an entity may be capable of changing from a varchar to an integer, and the changes to fields may be captured with the metadata. Fields (e.g. columns of a table) may be altered at runtime as opposed to compile-time in the dynamically-typed multi-tenant database.

After the Multi-tenant Database 118 has been replicated at the Application Database 104, the data and metadata can be synchronized with the Synchronization Component 128. The data from the Multi-tenant Database 118 may be retrieved and stored the Asynchronous Data Component 130. In one or more embodiments, the Asynchronous Data Component 130 is implemented as a cache and data and/or changes to data are captured in the cache. The Adapter 114 may provide the data to the Data Management Services 108 to put the data in the Application Database 104. The Client Device 100 may access or manipulate data in the Application Database 104 when the Occasionally Connected Application 102 is offline using an Application User Interface 138. The Application User Interface 138 may be created using Adaptable User Interface Components 134. When an indication is received by the Occasionally Connected Application Framework 116 that the Occasionally Connected Application 102 is connected to the Online Services System 106, then the Adapter 114 can perform a synchronization of data.

After the data is synchronized, the Client Device 100 may access or manipulate data using the Application User Interface 138 for the Occasionally Connected Application 102. The Client Device 100 may manipulate or access data when the Occasionally Connected Application 102 is offline by using the data locally stored at the Application Database 104. The Data Management Services 108 may have generated classes using metadata from the Multi-tenant Database 118 that can be instantiated and used by the Application User Interface 138 to access/manipulate data in the local Application Database 104. When the Occasionally Connected Application 102 is online, the Application User Interface 138 may access/manipulate data using remote method calls using instantiated classes generated from the metadata from the Multi-tenant Database 118. Alternatively, the Client Device 100 may access the Online Services System 106 over the Network 110 using the Web based Interface 132.

The Occasionally Connected Application 102 may be tested by an Asynchronous Test Application 140 created using the Asynchronous Test Framework 142. The Asynchronous Test Framework 142 may have a Test User Interface 144 to allow a user to select test(s) for the software application under test. The Application Test Components 146 may provide the ability to perform tests that include, but are not limited to, the following: testing asynchronous operation calls, testing multiple asynchronous operation calls, testing a user interface, testing the local database, garbage collection, and/or simulating delayed execution of an asynchronous operation. The Application Test Components 146 may provide the core test functionality to allow the development of tests. In one or more embodiments, the Application Test Components 146 may represent one or more elements of the Occasionally Connected Application 102 and/or Occasionally Connected Application Framework 116 and may be created to test the functionality of the element.

Figure 1B:
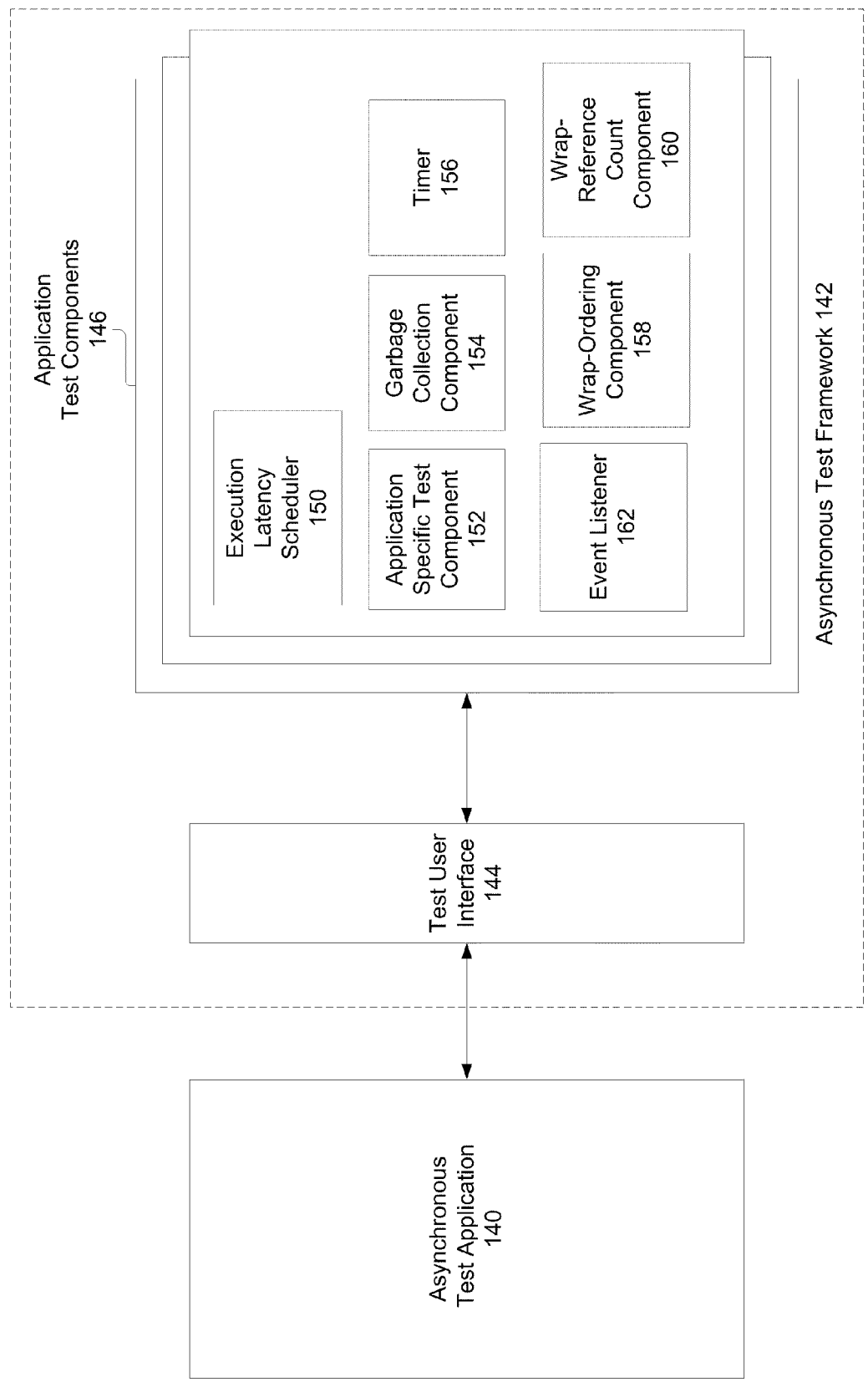
FIG. 1B illustrates a block diagram of an example of an implementation of performing asynchronous testing of an application occasionally connected to an online services system.

FIG. 1B illustrates a block diagram of an example of an implementation of performing asynchronous testing of an application occasionally connected to an online services system. FIG. 1B provides a more detailed view of an Asynchronous Test Application 140 implemented with an Asynchronous Test Framework 142. The Asynchronous Test Application 140 provides a Test User Interface 144 to allow a user to choose various tests for a software application under test, such as the Occasionally Connected Application 102. After detecting a selection of tests, one or more Application Test Components 146 may be instantiated. An Application Test Component 146 may have one or more of the following elements and/or offer access to one or more of the following elements: an Execution Latency Scheduler 150, an Application Specific Test Component 152, a Garbage Collection Component 154, a Timer 156, an Event Listener 162, a Wrap-Ordering Component 158, a Wrap-Reference Counting Component 160. In one or more embodiments, the Application Test Component 146 may be a class that provides methods/functions for determining an execution latency, an event listener, tracking and recording the order of asynchronous operation calls, reference counting, responder chaining, wrapped callbacks, scheduling of operation calls with an execution latency, garbage collection, checks for garbage collection by a software application under test, and/or rules for running tests for a particular component of the Occasionally Connected Application 102.

The Application Specific Test Component 146 may provide testing methods/functions for testing a particular component of the Occasionally Connected Application 102. The Garbage Collection Component 154 may keep track of all classes instantiated for testing (e.g. counting references), test that the software application under test has cleaned up all references upon completion of the test and/or if the software application fails, and ensure that the classes are deleted at completion and/or failure of the test.

A Timer 156 may be used to delay execution for estimation of an amount of time that an asynchronous operation may take to execute during normal operation of the software application, or for any other relevant estimation of time that may be experienced during execution of the software application. In an embodiment, Timer 156 may be used to delay execution of a function/method during a test for an amount of time indicated by an Execution Latency Scheduler 150. For example, if a delay is desired for an asynchronous operation call to a database server by the Execution Latency Scheduler 150 within a test for the software application, then a timer may be set to halt execution for the function and/or thread for a period of time. A variety of methods may be used for controlling the ordering of testing methods/functions provided by a software application under test, including, but not limited to: responder chaining, throwing events and listening for events, callbacks, and any other methods for controlling the order of testing functionality of a software application under test.

A callback may be a reference to executable code (e.g. a function, method) that may be passed as an argument to a first function and the executable code (e.g. a second function) passed as a reference to the first function may be called within the first function. The following pseudocode may illustrate a callback:

```
firstfunction(int argument1, functionReference secondfunction){
  secondfunction( ); }
``` and the function with the callback may be called with "firstfunction(5, secondfunction.Name);". Continuing with the example, the callback function "secondfunction.Name" function, in the example, may be called within the first function. In one or more embodiments, the callback function may be called at the end of the first function and the callback function may have an argument of the result of an asynchronous call made within the first function.

Responder chaining ensures that another asynchronous call is made upon completion of an earlier asynchronous operation call to the database. Asynchronous calls may be handled by a database server of the Online Services System 106 to execute commands against the Online Services Database 118. As indicated above, there may be a delay in receiving a response to the asynchronous call from the database server (e.g. an execution latency), and the times that asynchronous call responses are received and subsequent asynchronous calls are made with responder chaining may vary due to the delays in receiving responses to previous asynchronous calls. Responder chaining may provide assurances that subsequent asynchronous calls are made some time in the future upon receipt of a response to an earlier asynchronous call, but the times that subsequent asynchronous calls are made may vary. An implementation of responder chaining may be passing a callback argument function to an asynchronous call operation function. For example, the pseudocode for responder chaining, is as follows:

```
Builder.createOperation(int argument 1, functionReference responder){
        TestObject testObject =
Server.createAsynchronousCall(argument1); /* make asynchronous
call to Online Services System*/
            responder(testObject);}
        Builder.deleteOperation(TestObject argument1,
        functionReference responder){
            TestObject testObject =
Server.deleteAsynchronousCall(argument1); /* make asynchronous
call to Online Services System*/
            responder(testObject);}
        App.createOperation(int arg){
            Builder.createOperation(arg, App.deleteOperation);}
        App.deleteOperation(TestObject arg){
            //perform tests
            Builder.deleteOperation(arg, App.finishOperation);}
        App.finishOperation( ){
            //end async chaining}
    main( ){
        App.creationOperation(8);}
``` and may begin with a call in "main( )" to App.createOperation with "App.createOperation(8)." The function "App.createOperation" may call "Builder.createOperation(8, App.deleteOperation);" to make an asynchronous call "createAsynchronousCall" and start responder chaining. After the "createAsynchronousCall" receives a response from the server at some time in the future, "App.deleteOperation" may be called to execute another asynchronous call against the server. Although the next asynchronous delete operation call is called upon completion of the first asynchronous create call, there may be an execution latency experienced when executing the first asynchronous operation at the server. Continuing with the example, when the Builder.createOperation (8, App.deleteOperation) is called, the App.deleteOperation (testObject) may perform an asynchronous delete operation after completing the asynchronous create operation. There may be some uncertainty as to the exact timing of when the asynchronous call in deleteOperation are called, but with responder chaining one is assured that the next asynchronous call is made upon completion of the subsequent asynchronous call. In an embodiment, a function in responder chaining may introduce a delay to simulate an experience during normal execution of a software application. Although an implementation is described in the pseudocode using a Builder, those skilled in art will recognize that there are many ways to implement responder chaining.

Callbacks may be wrapped to ensure that references are counted and the order of sending requests and receiving responses from a database server for asynchronous operation call(s) may be recorded and/or logged. For example, the pseudocode for a wrapped function is as follows:

```
    wrap(responder res){
        recordOrder( ); //record order of asynchronous calls
        countReference++; //count of references increased
        setTimer(15); //Optionally, a timer may be set
        callServer(res); //perform operation of responder
        recordOrder( ); //record order of asynchronous calls
    }
``` and the wrapped function can be called with "Builder.createOperation(8, wrap(App.deleteOperation)." The wrap function "wrap" in the example may provide a way to check the order of the asynchronous calls and count the references, and the wrap function may call the next responder function (e.g. a delete operation). By recording/tracking the order of execution of operation calls and receipt of responses from operation calls, the execution latency experienced by running the asynchronous call against the database may be recorded. The order may be checked and/or recorded by printing when an asynchronous operation has been called and/or when a result of the asynchronous operation has been received in a log. For example, the log may contain the time the create operation was called and the result back from the database server for the create operation call. Although examples are given for recording the order of operations by printing/logging database operation calls sent/received to determine an execution of an asynchronous operation call, those skilled in the art will recognize that there may be many options for determining when the execution of asynchronous calls occurs. For example, a snapshot may be utilized to determine whether and when an asynchronous call has been executed against the database. In another example, the database server may send information on the execution latency of a particular asynchronous call with the response from the database server. One or more embodiments may record the execution of an asynchronous operation call by recording when a response is received back from each asynchronous operation call to the database server throughout the responder chaining. Because responder chaining ensures that subsequent calls are called when a previous call completes, the order of execution for each operation call may be recorded by keeping a record of when each response for an asynchronous call is received.

The Wrap-Ordering Component 158 may provide the functionality and/or wrapped functions for recording the order that asynchronous operations calls are sent to a database server and responses are received from the database server asynchronous operation calls. The Wrap-Reference Count Component 160 may provide the functionality and/or wrapped functions for counting references. As indicated in the prior examples, reference counting and checking the order of asynchronous call operations sent/responses received can be performed together in a wrapped function.

In one or more embodiments, an Event Listener 162 may be used to introduce a delay as experienced with normal execution of the software application. For example, an event may be thrown to indicate that an asynchronous call operation response has been received and the Event Listener 162 may listen for the event and allow the next asynchronous operation call to proceed. A timer may also be used to ensure an amount of time expires for introducing a delay.

Figure 2:
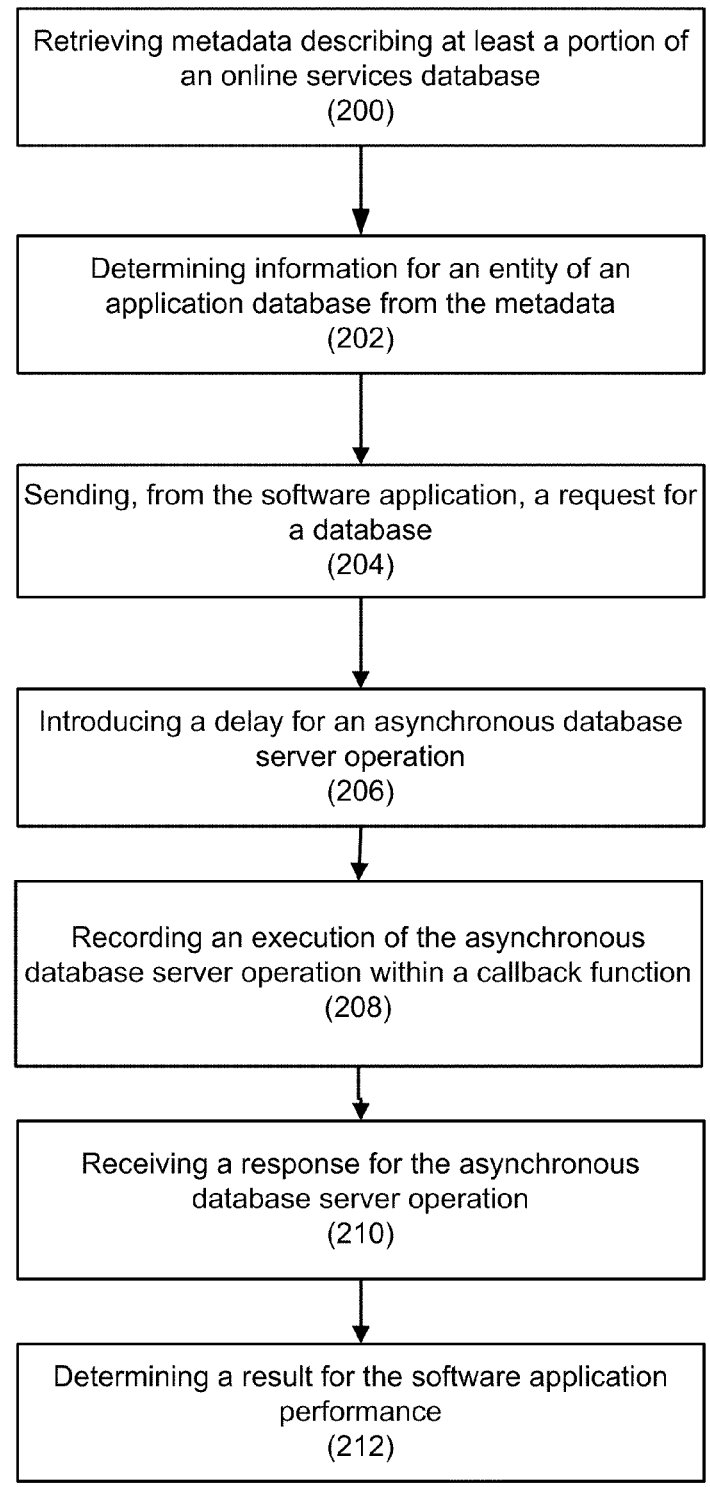
FIG. 2 illustrates an example of a simplified flow diagram of an implementation of performing asynchronous testing of an application occasionally connected to an online services system.

FIG. 2 illustrates an example of a simplified flow diagram of an implementation of performing asynchronous testing of an application occasionally connected to an online services system. Initially, metadata may be retrieved that describes at least a portion of an online services database (200). Metadata may be retrieved that describes a portion of the online services database that may be used for testing of the software application. Metadata may be retrieved that describes entities at the online services database that are to be replicated by the software application in a local database and/or that the software application is to synchronize data between the online services database and the local database. For example, metadata may be retrieved for an account entity that identifies one or more user(s) that are authorized to use the software application under test and/or metadata may be retrieved describing a portion of the online services system database that a particular user of the software application under test is authorized to receive. As used herein, the term "user" is meant to be construed broadly to cover a person, a set of users, a device and/or a software application, such that authentication of the user may entail authentication of a person, a software application, a device, or any combination thereof.

The metadata may be used to test the set up and execution of the software application under test for execution. By way of example, with the Occasionally Connected Application 102, metadata may be retrieved by the Adapter 114 that describes a portion of the online services system database that user(s) is authorized to retrieve to set up the application for the authenticated user, and the Asynchronous Test Application 140 may be created to test that a user is authenticated by the software application and that the Adapter 114 retrieves the metadata and data for the authenticated user. The Adapter 114 may retrieve the metadata from the Online Services System 106 (e.g. when connected to the online services system) or the Metadata Database 124 (e.g. when not connected) and the Asynchronous Test Application 140 may test the software application performance while connected and/or disconnected. The Asynchronous Test Application 140, in the example, may retrieve metadata on an account entity from the Online Services Database 118 as well as metadata on entities that the authenticated user is able to access or have replicated with the Occasionally Connected Application 102 in order to test the Occasionally Connected Application 102.

In another example, the Asynchronous Test Application 140 may retrieve metadata for a portion of the Online Services System Database 118 that has changed since the last synchronization of the Online Services System Database 118 and the Application Database 104. The software application under test may already be set up and executing, and the metadata that concerns the change at the Online Services System Database 118 may be used for testing the software application. The metadata may provide information on records, tables, and entities of the Online Services System Database 118 that are internal and/or have data that may be manipulated by the user with the Occasionally Connected Application 102. For example, metadata may be provided for a user role table, user account, or a bug management table that are only used internally by the Online Services System 106.

Continuing with FIG. 2, information for an entity of an application database may be determined (202). For example, the metadata from a WSDL file may define an entity that may need to be and/or is replicated at the Application Database 104, indicate that an entity has changed, and/or indicate that a user may no longer view the entity. The Asynchronous Test Application 140 may test the set up of the local database and supporting classes to access the local database and/or changes to the schema for the local database of the software application. The information for the entity may be sent to an Application Data Management Service 108 of the software application in an XML file to generate classes to access the data in the Application Database 104 and/or create or alter the schema with the information for the entity of the application database, and the Asynchronous Test Application 140 may test the performance of the Application Data Management Service 108 ability to create and/or alter the schema.

Next, a request, from the software application using an interface for the software application, may be sent for a database (204). The software application may request an asynchronous operation call to a database, such as a create, a read, an update and/or a delete operation call to the online services database. The software application under test may make a request of the online services database in cases, including, but not limited to the following: when the user interface is creation is tested, when the functionality offered by the user interface is tested, during testing of replication, synchronization of data, and/or any other type of request to the database by a software application. As indicated above, a software application, such as the Occasionally Connected Application 102, may have a local database, Application Database 104, to handle requests to the online services database, Online Services Database 118, when the software application is disconnected, and the Asynchronous Test Application 140 may test the performance of the Occasionally Connected Application 102 using both databases.

A delay may be introduced for execution of an asynchronous database server operation (206). The delay may be introduced in testing for reasons that include, but are not limited to: delaying to account for an execution latency of a database server operation call when simulating a database server, delaying a database operation call to account for an execution latency of a previous database operation call, and delaying execution of a database operation to simulate a user interacting with the software application under test. The delay for the asynchronous database server operation may be an amount of time to delay the execution of the asynchronous operation call. In one or more embodiments, Execution Latency Scheduler 150 determines the amount of time for the delay and the operation call to the database is made when the scheduled time delay has elapsed. The delay in execution of the asynchronous operation call may be an amount of time that is an estimate of an amount of time a database server would take to respond to the operation call. Alternatively, the delay in execution of the asynchronous operation call may be an amount of time to delay operation execution to ensure that the software application appears to experience a delay in operation execution as if the asynchronous calls were executed in a synchronous fashion.

In one or more embodiments, a plurality of asynchronous operation calls may appear to occur in a synchronous fashion by using responder chaining to call each asynchronous operation call in the plurality after a response has been received for the previous asynchronous operation call. By ensuring that the order of operations is synchronous, a result may be received for the prior asynchronous operation call and a subsequent operation call may avoid errors that can be introduced by the delay caused by an execution latency of an asynchronous operation call. For example, an asynchronous operation call to create an attribute within a table in the database may first execute before a second asynchronous operation call to access the recently created attribute with responder chaining.

A delay may be introduced by causing the Event Listener 162 to wait for an event at the end of an asynchronous call and delaying execution of a next asynchronous operation call after the event is received. A timer may also be used to introduce a delay either to simulate the execution latency for an asynchronous operation call and/or simulate use of the software application under test.

Optionally, the Asynchronous Test Application 140 may handle requests by emulating the online services database and introduce a delay by sending test data in response to the database request from the software application under test with a delay. The introduced delay may be an estimation of an execution latency experienced with an asynchronous call.

In one or more embodiments, the metadata may indicate what data the user is allowed to receive from the Online Services System Database 118, and the Asynchronous Test Application 140 may record errors when the software application makes requests for data that may not be retrieved and/or requests for operations by the user in accordance with metadata.

Continuing with FIG. 2, an execution of the asynchronous database server call may be recorded within a callback function (208). The Asynchronous Test Application 140 may use responder chaining and "wrap" a request using a wrapped callback function in order to test the software application. A wrapped callback may be used in conjunction with responder chaining and the wrapped callback may record the execution of the asynchronous database operation call. By using the wrapped callback function with responder chaining, the Asynchronous Test Application 140 can control the order that the online services database handles the subsequent request(s), and record when the asynchronous calls are sent and responses for the requests are received to determine when the execution of the asynchronous call occurred and the execution latency of asynchronous calls. By recording the actual execution time of each call, it can be determined whether asynchronous calls are made, whether asynchronous calls are made in the proper order, and after a reasonable amount of time. In one or more embodiments, the Wrap-Ordering Component 158 may have functions that can be used to record the order of asynchronous calls by recording asynchronous calls sent and responses received for asynchronous operation calls.

Embodiments may use a Wrap-Reference Count Component 160 function to track references of test objects created during execution of the software application under test. References may be tracked by counting references and/or creating a list of references for objects created during a test of a software application.

A response may be sent to the software application for the asynchronous operation call (210). A result for the performance of the software application may be determined (212). The result for the software application may indicate the following performance of the software application, including, but not limited to: replication of the online services database, synchronization between the application database and the online services database, proper response of the software application when the application is connected/disconnected, and/or conflict resolution. For example, the result of the performance of the software application for an asynchronous operation call to the online services database may indicate whether replication of the online services database and/or synchronization of data between the Application Database 104 and Online Services Database 118 are being handled correctly for an entity.

Continuing with the example, the information determined for the entity from the metadata may indicate whether the entity should be replicated at the Application Database 104, changes to the entity that should be reflected at the Application Database 104 after the software application retrieved metadata, and what data should be synchronized between the Application Database 104 and Online Services Database 118 for a particular user. The Asynchronous Test Application 140 may provide a result on the performance of the software application for the entity in accordance with the metadata retrieved. The Asynchronous Test Application 140 may provide a log of the order of asynchronous operation calls and responses received, and a allow for a determination as to whether a failure is due to the software application or as a result of a delay in execution of an asynchronous operation call. Failures with synchronization and/or replication may be attributed to an asynchronous call operation to retrieve data from the online services database not returning with the data before an attempt to access the data occurred with the test. The success or failure of the software application under test with the asynchronous operation call may be logged. Optionally, garbage collection may be performed for the objects created for running the selected tests upon completion test if the software application did not delete all objects used during the test.

Figure 3:
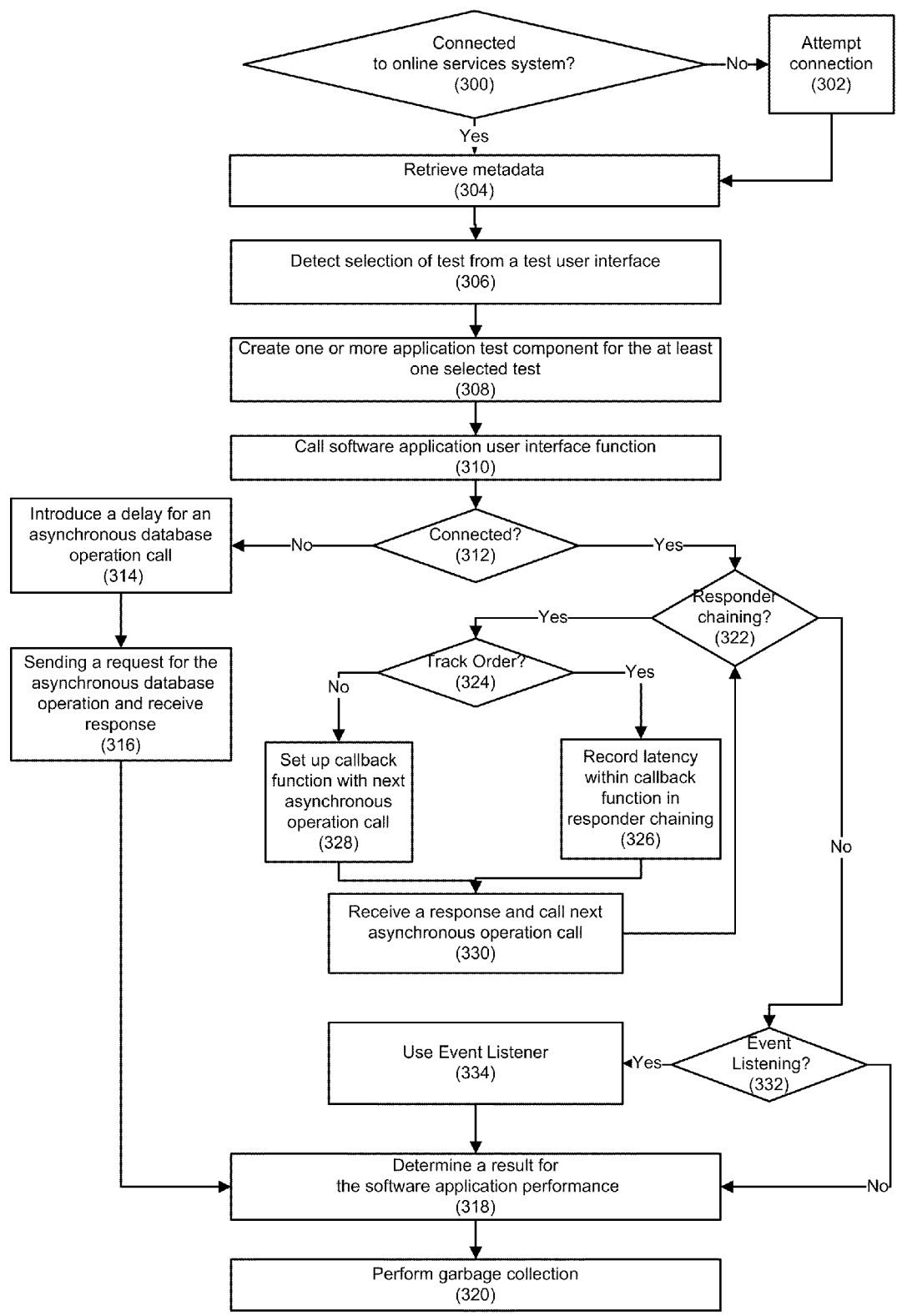
FIG. 3 illustrates an example of a more detailed flow diagram of an implementation of performing asynchronous testing of an application occasionally connected to an online services system.

FIG. 3 illustrates an example of a more detailed flow diagram of an implementation of performing asynchronous testing of an application occasionally connected to an online services system. Initially, a determination is made as to whether the Occasionally Connected Application 102 and/or Asynchronous Test Application 140 are connected to the Online Services System 106 (300). If the Occasionally Connected Application 102 and/or the Asynchronous Test Application 140 are not connected, then a connection to the Online Services System 106 may be attempted (302). As indicated above, the Occasionally Connected Application 102 may or may not be connected to an Online Services System 106 and testing of the Occasionally Connected Application 102 may be performed whether connected or disconnected. If a connection is possible, then the Occasionally Connected Application 102 and/or the Asynchronous Test Application 140 may be connected to the Online Services System 106. Next, metadata may be retrieved (304).

Continuing with FIG. 3, alternatively the Occasionally Connected Application 102 and/or the Asynchronous Test Application 140 may be connected to the Online Services System 106 (300) and metadata may be retrieved (304). Metadata may be retrieved from the Online Services System 106 Online Services Database 118 and/or the Occasionally Connected Application 102 Metadata Database 124. The Asynchronous Test Application 140 may be testing the Occasionally Connected Application 102 in handling replication of the Online Services System 106 and synchronization with the Online Services System 106 while connected and/or disconnected. By retrieving the metadata, the Asynchronous Test Application 140 may be able to test the replication of the Online Services Database 118 because the Asynchronous Test Application 140 may have an accurate picture of what the Application Database 104 schema should reflect and what the Metadata Database 124 should contain with the retrieved metadata. The retrieved metadata may likewise be used to test the Adapter 114 and Data Management Services 114 which are components that contribute to replication of entities at the Online Services Database 118 to the Application Database 104.

In one or more embodiments, the Occasionally Connected Application Framework 116 may have Adaptable User Interface Components 134. The Adaptable User Interface Components 134 may mimic the look and feel of the Online Services System 106 user interface or the user can use the Adaptable User Interface Components 134 to build custom user interfaces. The metadata may define the look and feel of the Online Services System 106 and/or define the entity fields that the user is able to access for the user interface. The metadata may indicate the data that the user is allowed to have displayed and/or provide a layout that is available at the Online Services System 106. The Adaptable User Interface Component 134 may render user interface elements that include, but are not limited to, field values of an entity, entity field name and the field value, the entire entity, or the entity as displayed at the online service. The Adaptable User Interface Component 134 may optionally provide internationalization and localization capabilities. For example, the metadata may indicate the language for the user and the user interface may display the entity in the appropriate language for the user. The Asynchronous Test Application 140 may test that the metadata has been adhered to for the generation of the user interface as while as to whether the localization/internationalization has been correctly applied at the software application in accordance with the metadata.

Next, a selection of one or more tests may be detected (306). The user may select tests from the Test User Interface 144. If a connection is not possible to the Online Services System 106, then the user may be limited to selection of tests for the disconnected Occasionally Connected Application 102. In one or more embodiments, the metadata may indicate what tests are available to the user. For example, the metadata may indicate that a change to the schema has occurred since the last retrieval of metadata that is available to the Occasionally Connected Application 102 in the Metadata Database 124, and this would allow for testing of the Occasionally Connected Application 102 ability to reflect the change to the schema at the Application Database 104.

One or more application test components may be created for the selected test (308). The Asynchronous Test Application 140 may be able to handle compound tests and run test one after the other. In one or more embodiments, Application Test Components 146 may be created/instantiated for each test. The Application Test Components 146 may represent a test for one or more elements of the Occasionally Connected Application 102 and Occasionally Connected Application Framework 116. For example, if a user selects to test conflict resolution, an Application Test Component 146 may be created for the Conflict Resolution Component 120 and the Application Specific Test Component 152 for the Conflict Resolution Component 120 may have specific testing for conflict resolution. In order to provoke a conflict for testing, a user may select to test the user interface and attempt to update an attribute of an entity that would provoke a conflict, and then run a compound test with a test for conflict resolution following the user interface test that provoked the conflict.

In one or more embodiments, the Asynchronous Test Application 140 may test the setup of the Occasionally Connected Application 102. The Asynchronous Test Application 140 may test how the elements of the Occasionally Connected Application 102 and Occasionally Connected Application Framework 116 handle setting up the application for execution. For example, when an application is first created or metadata changes indicate a full synchronization between the Application Database 104 and the Online Services Database 118 is desired, all metadata and data concerning the entities that a user is authorized to receive may be retrieved by the Adapter 114 of the Occasionally Connected Application Framework 116. The Data Management Services 108 may generate a schema for the Application Database 104 and generate classes to be remote objects representing the entities at the Application Database 104 and the Multi-tenant Database 118 when instantiated. The Data Management Services 108 may fill the tables of the Application Database 104 with the retrieved data. The Asynchronous Test Application 140 may test all of the components for setting of the application.

Alternatively, metadata and data that may affect the entities for a user at the Occasionally Connected Application 102 may be incrementally received from the Multi-tenant Database 118, and the Asynchronous Test Application 140 may test the handling of incremental changes for the dynamic schema of the Multi-tenant Database 118. For example, the metadata and data for a portion of the entities that a user is authorized to receive may be received each time a connection is detected or when the user designates a desire to synchronize data. In one or more embodiments of the Occasionally Connected Application 102, the classes generated are dynamic and are not fixed at compile time so changes indicated by metadata and data that affect an entity may be reflected at the Occasionally Connected Application 102 without a full synchronization. A dynamic class may be compiled and a new attribute or property may be added to the class at runtime. For example, if metadata indicates that a "Contact" entity now has a new SocialSecurityNumber field, you will be able to use an instance of the Contact class and use get/set methods for the property contact.SocialSecurityNumber, even though the Contact class was initially compiled without this property. These changes may be reflected at the user interface as well as databases for the Occasionally Connected Application 102 and the Asynchronous Test Application 102 may test the handling of the changes to the schema and user interface by the Occasionally Connected Application 102.

A call may be made to the user interface of the software application (310). The Asynchronous Test Application 140 may test the user interface of the Occasionally Connected Application 102 by sending a call to the user interface to simulate a user interacting with the software application. The request to the user interface of the Occasionally Connected Application 102 may involve sending a request to a database of the Occasionally Connected Application 102 (312). For example, a request may be made to through the user interface to update an attribute of an entity at the Occasionally Connected Application 102.

The request to a database of the Occasionally Connected Application 102 may involve an asynchronous operation call to a database server (e.g. create, read, update and/or delete) and a delay for the asynchronous database operation may be introduced. The delay may be an amount of time that is an estimation including, but not limited to, the following cases: an estimation for how long the database server may respond to a request with a heavy load on the database server, an estimation of the amount of time a user may take inputting requests with the user interface, and any other estimations of time that may be relevant for testing the software application under test. For example, a test may be run to provoke a conflict by inputting an update to an attribute that no longer exists at the online services database and an amount of time may be estimated to determine an execution latency for when a user may attempt to access the entity with the attribute that provoked a conflict with the user interface.

Next, a determination may be made as to whether the software application under test is connected to an online services database (312). If a determination is made that the software application under test is not connected to an online services database (312), then a delay may be introduced for an asynchronous database operation call (314) in order to simulate a delay that may be experienced with an asynchronous database operation call executed against the online services database. Alternatively, the Asynchronous Test Application 102 may test the local database and execute the command against a local database without the connection to the online services database. Test data may be used to create a change to the data and/or schema that may provoke a conflict that can be tested with a following test with the Occasionally Connected Application 102 connected to the Online Services Database 118. Test data that provokes a function may be at both the client-side and server-side to test conflict handling. For example, a change to the schema may be introduced at the Online Services Database 118 to remove a column and the test data executed against the Application Database 104 may change data within the removed column. When the metadata is retrieved from the Online Services Database 118 after a connection is detected with the Occasionally Connected Application 102, conflict handling may be tested, in the example, because the metadata should indicate that a conflict has arisen. By way of example, conflict handling may also be tested with a dynamically-typed database when the type of data for a column has changed from long to varchar.

Next, the request for the asynchronous database operation is sent and a response is received (316). A determination may be made as to a result for the performance of the software application (318) and garbage collection may be performed (320). The Asynchronous Test Application 102 may test garbage collection of the Occasionally Connected Application 102 and clean up any test data that has not been deleted at both the client-side and server-side.

Continuing with FIG. 3, if a determination is made that the software application under test is connected to an online services database (312), then a determination is made as to whether to use responder chaining (322). Responder chaining may be used to introduce a delay in executing subsequent asynchronous database operation calls and to record the execution latency of an asynchronous database operation call to the online services database. If a determination is made to use responder chaining (322), then a determination may be made as to whether to track the order of asynchronous database operations sent and responses received for the asynchronous database operations (324). If a determination is made to track the order of asynchronous database operation calls (324), then the execution latency may be recorded within a callback function for the responder chaining (326). In one or more embodiments, the execution latency may be recorded with a wrapped callback function that is passed as an argument for the function performing the asynchronous database operation against the online services database. The execution latency may be recorded by printing a time that an asynchronous database operation call is sent and a time that the asynchronous database operation call is received. In another embodiment, the execution latency may be recorded in a log.

Alternatively, if a determination is made not to track order (324), then the callback function for responder chaining may be set up without recording the execution latency (328). The callback function for responder chaining may be set up by passing an argument with the next asynchronous database operation in the chain. Next, a response to the asynchronous database operation call may be received and the next asynchronous database operation call in the chain of asynchronous database calls may be called. A determination may then be made as to whether to perform responder chaining with the next asynchronous database operation call in the chain (322) and the process may repeat.

Continuing with FIG. 3, if a determination is made to not perform responder chaining for the asynchronous database operation (322), then a determination may be made as to whether to introduce a delay using an event listener (332). If a delay with an event listener is desired (332), then an event listener may be used (334). For example, a request to listen for an event of a response received for an asynchronous database operation may be requested and an event may be thrown upon completion of the asynchronous operation call. Alternatively, if a delay with an event listener is not desired (332), then a determination may be made as to a result for the performance of the software application under test (318).

A result for the software application performance may be determined (318). In one or more embodiments, a log may be kept of the result for the software application performance. The log may indicate times that the software application requested and received a response for the asynchronous operation call to the database.

Garbage collection may then be performed (320). The Asynchronous Test Application 140 may keep track of all objects created for performing the test and delete the objects at the end of testing.

Metadata Database

In a preferred embodiment of the Occasionally Connected Application 102, after a user has been authenticated by logging in to the Occasionally Connected Application 102, a call is issued to get the metadata for the entities identified for the user by the administrator. For each entity, additional user interface metadata is retrieved for use with the Adaptable User Interface Components 134. A different metadata database may be created for each user which may allow multiple users to login to the same application without overwriting the metadata database. The Asynchronous Test Application 140 may test that the proper metadata is retrieved for an authenticated user.

Synchronization

In a preferred embodiment of the Occasionally Connected Application 102, a synchronization API call for data returns a set of created/updated/deleted objects since the last synchronization. The Adapter 114 may convert each returned object into an object for the Application Database 104 and requests the Data Management Service 108 store the object in the Application Database 104. The Asynchronous Test Application 140 may test that the Occasionally Connected Application 102 by making a series of asynchronous application operation calls at the online services database and testing the synchronization handled by the Adapter 114 and Data Management Service 108.

In a preferred embodiment of the Occasionally Connected Application 102, a partial synchronization may be performed after every save/delete/update operation at the Multi-tenant Database 118. The inventors note that by performing synchronization after an operation at the Multi-tenant Database 118, any effects of the previous operation may be reflected at the Application Database 104 and the record that was just affected by the operation may be saved to the Application Database 104. In another preferred embodiment of the Occasionally Connected Application 102, an automatic periodic synchronization may be performed after a default interval (e.g., 20 minutes of inactivity). If the metadata changes are detected during the synchronization, a flag may be set in a preferred embodiment of the Occasionally Connected Application 102. The Asynchronous Test Application 140 may test partial synchronization and interval synchronization by the Occasionally Connected Application 102 by introducing changes at the Multi-tenant Database 118 and/or Application Database 104 that should be replicated between the databases.

System Overview

Figure 4:
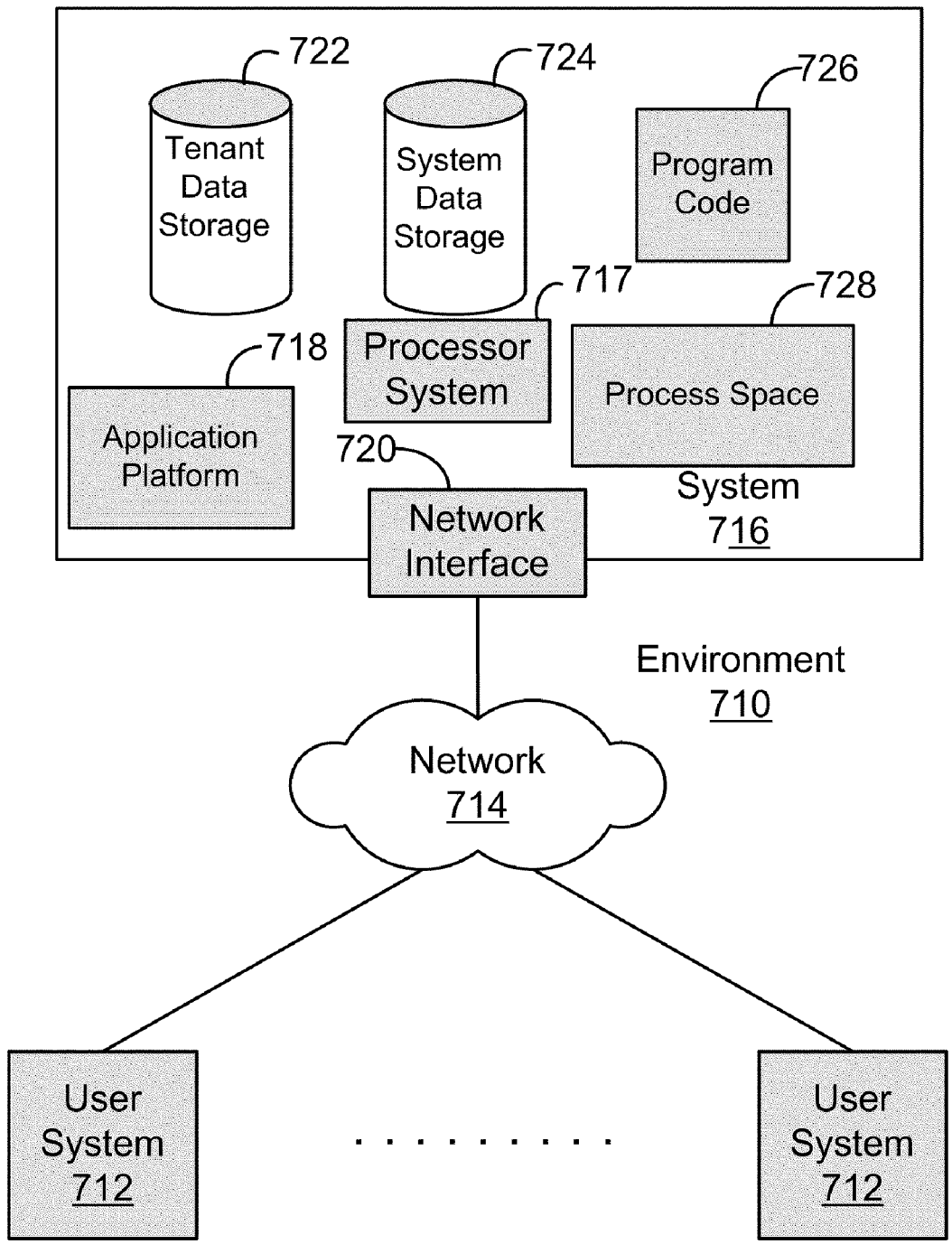
FIG. 4 illustrates a block diagram of an example of an environment wherein an on-demand database service might be used.

FIG. 4 illustrates a block diagram of an environment 710 wherein an on-demand database service might be used. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 4 (and in more detail in FIG. 5) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 4, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 4, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 4 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application (s) including computer code to run using a central processing unit such as processor system 717, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, Flex, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
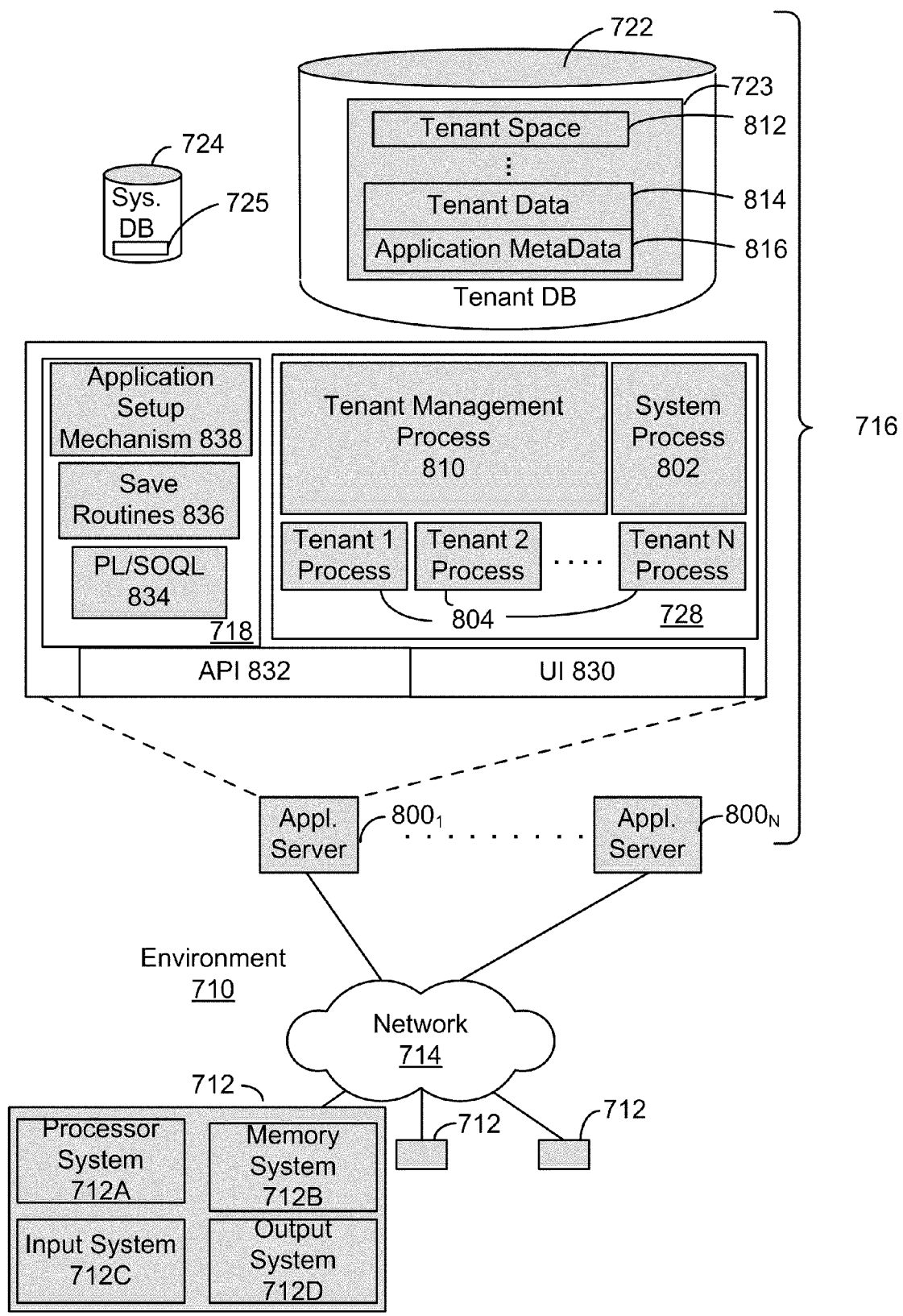
FIG. 5 illustrates a block diagram of an embodiment of elements of FIG. 4 and various possible interconnections between these elements.

FIG. 5 also illustrates environment 710. However, in FIG. 5 elements of system 716 and various interconnections in an embodiment are further illustrated. FIG. 5 shows that user system 712 may include processor system 712A, memory system 712B, input system 712C, and output system 712D. FIG. 5 shows network 714 and system 716. FIG. 5 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers 800₁-800N, system process space 802, tenant process spaces 804, tenant management process space 810, tenant storage area 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 4. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 5, system 716 may include a network interface 720 (of FIG. 4) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. Invocations to applications may be detected by one or more system processes, which manages retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server 800₁ might be coupled via the network 714 (e.g., the Internet), another application server 800N-1 might be coupled via a direct network link, and another application server 800N might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 700 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for performing asynchronous testing of an application that is occasionally connected to an online services system, the method comprising:
   retrieving metadata describing at least a portion of an online services database, wherein the at least a portion of the online services database is authorized for replication at a software application;
   determining information for an entity for an application database from the metadata;
   sending a request for a database using the software application interface, wherein the request comprises an asynchronous operation call to the database for the entity;
   recording an execution of the asynchronous operation call within a callback function;
   receiving a response for the asynchronous operation call;
   determining a result for the software application performance;
   performing responder chaining with a wrapped callback function;
   recording an execution latency experienced with the asynchronous operation call using the wrapped callback function, wherein recording the execution latency comprises recording a time that the asynchronous operation call is sent and a time for receipt of the response to the asynchronous operation call; and
   determining whether an error with the software application occurred before the time for receipt of the response to the asynchronous operation call.

2. A method for performing asynchronous testing of an application that is occasionally connected to an online services system, the method comprising:
   retrieving metadata describing at least a portion of an online services database, wherein the at least a portion of the online services database is authorized for replication at a software application;
   determining information for an entity for an application database from the metadata;
   sending a request for a database using the software application interface, wherein the request comprises an asynchronous operation call to the database for the entity;
   recording an execution of the asynchronous operation call within a callback function;
   receiving a response for the asynchronous operation call;
   determining a result for the software application performance;
   detecting no connection to an online services system;
   determining a delay that is an estimated amount of time to wait for execution of the asynchronous operation call that may be experienced by the software application during normal execution of the software application;
   introducing the delay with a timed wait; and
   sending the request for the application database after the timed wait.

3. A method for performing asynchronous testing of an application that is occasionally connected to an online services system, the method comprising:
   retrieving metadata describing at least a portion of an online services database, wherein the at least a portion of the online services database is authorized for replication at a software application;
   determining information for an entity for an application database from the metadata;
   sending a request for a database using the software application interface, wherein the request comprises an asynchronous operation call to the database for the entity;
   recording an execution of the asynchronous operation call within a callback function;
   receiving a response for the asynchronous operation call;
   determining a result for the software application performance;
   detecting a connection to an online services system; and
   retrieving metadata from the online services database, wherein the request for the database comprises a request for the online services database.

4. A method for performing asynchronous testing of an application that is occasionally connected to an online services system, the method comprising:
   retrieving metadata describing at least a portion of an online services database, wherein the at least a portion of the online services database is authorized for replication at a software application;
   determining information for an entity for an application database from the metadata;
   sending a request for a database using the software application interface, wherein the request comprises an asynchronous operation call to the database for the entity;
   recording an execution of the asynchronous operation call within a callback function;
   receiving a response for the asynchronous operation call; and
   determining a result for the software application performance, wherein the result for the software application performance comprises performance of the software application in handling conflict resolution.

5. A method for performing asynchronous testing of an application that is occasionally connected to an online services system, the method comprising:
- retrieving metadata describing at least a portion of an online services database, wherein the at least a portion of the online services database is authorized for replication at a software application;
- determining information for an entity for an application database from the metadata;
- sending a request for a database using the software application interface, wherein the request comprises an asynchronous operation call to the database for the entity;
- recording an execution of the asynchronous operation call within a callback function;
- receiving a response for the asynchronous operation call; and
- determining a result for the software application performance, wherein the result for the software application performance comprises performance of the software application in at least one of replication of the entity from the online services database and synchronization of data for the entity between the application database and the online services database.

6. A computer-readable storage medium having one or more instructions thereon for performing asynchronous testing of an application that is occasionally connected to an online services system, the instructions when executed by one or more processors causing the one or more processors to carry out:
- retrieving metadata describing at least a portion of an online services database, wherein the at least a portion of the online services database is authorized for replication at a software application;
- determining information for an entity for an application database from the metadata;
- sending a request for a database using the software application interface, wherein the request comprises an asynchronous operation call to the database for the entity;
- recording an execution of the asynchronous operation call within a callback function;
- receiving a response for the asynchronous operation call;
- determining a result for the software application performance;
- performing responder chaining with a wrapped callback function;
- recording an execution latency experienced with the asynchronous operation call using the wrapped callback function, wherein recording the execution latency comprises recording a time that the asynchronous operation call is sent and a time for receipt of the response to the asynchronous operation call; and
- determining whether an error with the software application occurred before the time for receipt of the response to the asynchronous operation call.

7. A computer-readable storage medium having one or more instructions thereon for performing asynchronous testing of an application that is occasionally connected to an online services system, the instructions when executed by one or more processors causing the one or more processors to carry out:
- retrieving metadata describing at least a portion of an online services database, wherein the at least a portion of the online services database is authorized for replication at a software application;
- determining information for an entity for an application database from the metadata;
- sending a request for a database using the software application interface, wherein the request comprises an asynchronous operation call to the database for the entity;
- recording an execution of the asynchronous operation call within a callback function;
- receiving a response for the asynchronous operation call;
- determining a result for the software application performance;
- detecting no connection to an online services system;
- determining a delay that is an estimated amount of time to wait for execution of the asynchronous operation call that may be experienced by the software application during normal execution of the software application;
- introducing the delay with a timed wait; and
- sending the request for the application database after the timed wait.

8. A computer-readable storage medium having one or more instructions thereon for performing asynchronous testing of an application that is occasionally connected to an online services system, the instructions when executed by one or more processors causing the one or more processors to carry out:
- retrieving metadata describing at least a portion of an online services database, wherein the at least a portion of the online services database is authorized for replication at a software application;
- determining information for an entity for an application database from the metadata;
- sending a request for a database using the software application interface, wherein the request comprises an asynchronous operation call to the database for the entity;
- recording an execution of the asynchronous operation call within a callback function;
- receiving a response for the asynchronous operation call;
- determining a result for the software application performance;
- detecting a connection to an online services system; and
- retrieving metadata from the online services database, wherein the request for the database comprises a request for the online services database.

* * * * *